United States Patent [19]
Birkle et al.

[11] 4,023,438
[45] May 17, 1977

[54] TORSIONAL VIBRATION DAMPER

[75] Inventors: Hans Gerhard Birkle, Lindau, Bodensee, Germany; Josef Krebitz, Horbranz, Austria

[73] Assignee: Metzeler Kautschuk AG, Munich, Germany

[22] Filed: Apr. 15, 1975

[21] Appl. No.: 568,244

[52] U.S. Cl. .................. 74/574; 64/1 V; 188/1 B
[51] Int. Cl.² ........................... F16F 15/10
[58] Field of Search ............ 74/574; 188/1 B; 64/1 V, 11 R

[56] References Cited
UNITED STATES PATENTS

| | | | |
|---|---|---|---|
| 1,978,199 | 10/1934 | Harris | 74/574 |
| 2,898,777 | 8/1959 | Boehm | 74/574 |
| 3,174,360 | 3/1965 | Katzenberger | 74/574 |
| 3,196,710 | 7/1965 | Peirce | 188/1 B X |

Primary Examiner—Samuel Scott
Assistant Examiner—Randall Heald
Attorney, Agent, or Firm—Michael J. Striker

[57] ABSTRACT

A hub element of the vibration damper is adapted for connection to a shaft and has a first circumferentially extending support surface. An inertia element surrounds the hub element and has a circumferentially extending second support surface. An elastomeric member is compressed between these surfaces and mounts the inertia element on the hub element with freedom of vibration. An arrangement is provided on one or the other of the elements for continuously varying the characteristic frequency of vibration of the damper, by subjecting the elastomeric member in axial or radial direction to continuously variable compression.

6 Claims, 3 Drawing Figures

TORSIONAL VIBRATION DAMPER

BACKGROUND OF THE INVENTION

The present invention relates to a torsional vibration damper for shafts, especially for crankshafts of interal combustion engines.

A torsional vibration damper of the general type here in question is described in U.S. Pat. No. 3,196,710, to which reference may be had for details concerning the operation and utilization of such dampers. The device disclosed in that patent produces an initial stressing of an elastomeric element or elements by surrounding components which exert compressive stress upon the elastomeric element or elements. The stress-producing component may, for example, be joined together by means of rivets or screws in order to permit the elastomeric element or elements to be compressed between them. Two such surrounding components are urged towards one another in the specific disclosure of the U.S. patent by means of screws, so that they are brought into rigid and direct contact with one another, compressing an elastomeric element or elements between them along a radially oblique active surface so as to cramp and prestress the elastomeric element or elements. The characteristic frequency of the torsional vibration damper, which depends upon the initial stressing (i.e., compressing) of the elastomeric element or elements, is fixed in the construction according to U.S. Pat. No. 3,196,710, because the components between which the elastomeric element or elements are compressed are screwed together to the maximum extent permissible.

SUMMARY OF THE INVENTION

It is a general object of the present invention to provide a torsional vibration damper of the type mentioned hereinbefore, which can be readily adjusted in order to adapt its characteristic frequency to a range of vibrations which it is desired to control.

More particularly, it is an object of the invention to provide such a vibration damper whose characteristic frequency is readily adjustable over a wide range without requiring any alteration in shape and/or construction of the basic components of the damper.

An additional object of the invention is to provide such vibration damper wherein the adjustment of the characteristic frequency of the damper can be carried out without having to disassemble any of the components of the damper from the others.

In keeping with these objects, and with others which will become apparent hereafter, one feature of the invention resides in a torsional vibration damper for a shaft, particularly for a crankshaft, which briefly stated comprises a hub element adapted to be connected to a shaft and having a first circumferentially extending support surface. An inertia element surrounds the hub element and has a circumferentially extending second support surface. An elastomeric member is compressed between these surfaces and mounts the inertia element on the hub element with freedom of vibration. Means are provided for continuously varying the characteristic frequency of vibration of the damper.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
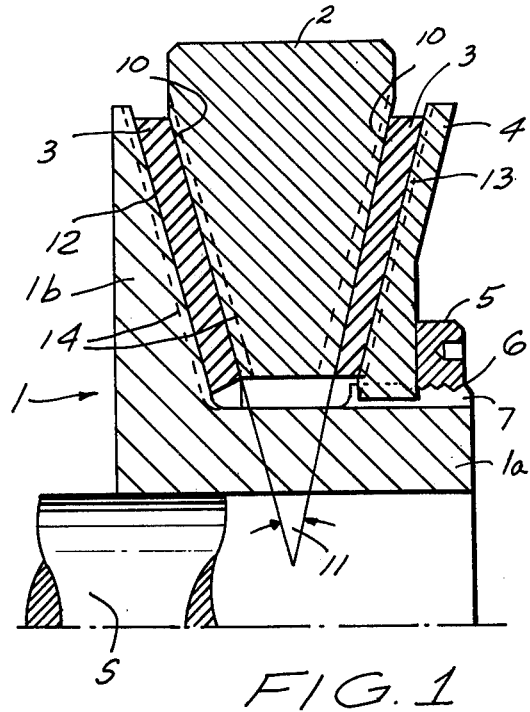
FIG. 1 is an axial section through a first embodiment of the invention, showing one-half of an annular vibration damper, it being understood that the half that is not illustrated is mirror-symmetrical with reference to the half that is shown.
Figure 1A:
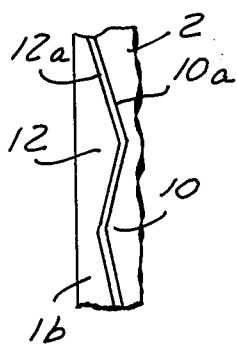
FIG. 1A is a fragmentary developed view showing a detail of FIG. 1.

Referring now to the drawing in detail, and firstly describing the embodiment in FIGS. 1 and 1A, it will be seen that the vibration damper shown in this Figure is illustrated as being mounted on the fragmentarily shown shaft S, which may for example be a crankshaft of a internal combustion engine. The vibration damper has a hub 1 which is mounted on the shaft S, surrounding the same, and which has a hollow cylindrical hub portion 1a and a radially extending flange 1b. Axially spaced from the flange 1b the hub portion 1a is formed with an axially extending guideway 7 which is provided with external threads 6. A compression-exerting member 4, which may also be considered as a movable flange and which is of annular configuration, is pushed onto the hub portion 1a and in part extends into the guideway 7 so that it can slide axially of the guideway 7 but cannot turn with reference to the hub 1. The flange 1b has a support surface 12 which faces towards the member 4, and the latter has a support surface 13 which faces towards the flange 1b. In this embodiment these surfaces 12 and 13 are mutually inclined at an acute angle 11 in a substantially V-shaped configuration.

The hub portion 1a is surrounded by an annular inertia member 2 whose purpose and action are disclosed in the aforementioned U.S. patent and which is provided at its opposite axial ends with inclined contact faces 10 juxtaposed with the surface 12 and the surface 13, respectively. The faces 10 are mutually inclined with reference to one another at the angle 11 also. Each face 10 forms with the juxtaposed surface 12 or 13 an annular gap in which an annular elastomeric member 3 is received. The elastomeric elements 3 may be either fixedly connected to the surfaces 10 and 12 (or 10 and 13), as for example by means of an adhesive (any rubber-to-metal bonding adhesive will serve) or by vulcanization, or else they may merely be in frictional contact with the associated surfaces.

The elastomeric members 3 are compressed when the member 4 is made to move axially of the hub portion 1a towards the flange 1b. This movement is effected by turning of a ring nut 5 which is threaded onto the threads 6 of the guideway 7 and abuts one axial end of the member 4. Evidently, the further the nut 5 is threaded onto the hub portion 1a, the further it will push the member 4 (towards the left in FIG. 1) and thereby cause compression of the two elastomeric members 3. The compression to which the elastomeric members 3 are subjected can thus be varied steplessly depending upon the extent to which the nut 5 is threaded onto the hub portion 1a.

According to the present invention the faces 10 and the surfaces 12 and 13, which are of course all annular, are not planar. Instead, as indicated by the broken lines in FIG. 1, these faces and surfaces undulate in circumferential direction of the flange 1b and of the members 2 and 4. The term "undulate" indicates either a zig-zag configuration, or a wavy configuration. To show this more clearly, FIG. 1A illustrates the configuration of the juxtaposed face 10 and surface 12 in a developed edge view of the flange 1b and the inertia member 2. The face 10 and the surface 12 are shown closer together than they would normally be. The member 3 which is normally located between them has been omitted in FIG. 1A to permit a closer juxtaposition of the surface 12 with the face 10, for the sake of better explanation. It is important according to the present invention that the oppositely located surface portions, such as for example the portion 10a of the face 10 and the portion 12a of the surface 12, extend parallel to one another, whether the configuration is zig-zag or wavy. This assures (keeping in mind that in the assembled condition the elastomeric member 3 is located between the face 10 and the surface 12) any relative circumferential displacement of hub 1 and inertia member 2 will subject the elastomeric element 3 not only to a tangential stress but also to compression and tensile stress. The same configuration as shown in FIG. 1A for the face 10 and the juxtaposed surface 12 is also provided on the surface 13 and the face 10 that is juxtaposed therewith.

Figure 2:
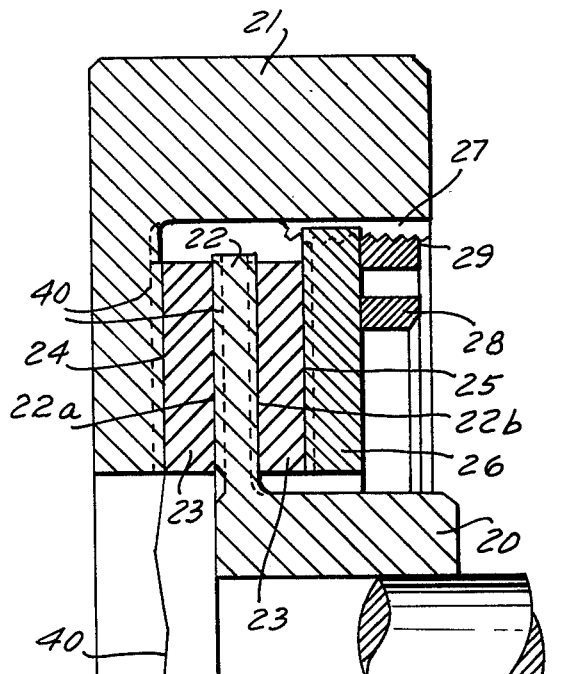
FIG. 2 is a view similar to FIG. 1 but illustrating a further embodiment of the invention.

FIG. 2 shows a further embodiment in which the hub member 20 is concentrically surrounded by an inertia member 21, and a flange 22 of the hub member 20 has its undulating surface 22a joined to a similar undulating surface 24 of the inertia member 21 by means of an interposed annular elastomeric member 23 which may be connected to these surfaces as described with respect to FIG. 1. The undulating surface portions (corresponding to those shown in FIG. 1A) are identified with reference numeral 40 in FIG. 2. At the opposite axial side the flange 22 is provided with a further undulating annular surface 22b which is juxtaposed with a similar undulating surface 25 on an annular member 26, a further elastomeric annular member 23 being interposed between and connected to these surfaces also, again as before by bonding, by vulcanization, by polymerization or merely by frictional contact. The requirement that opposite surface portions of juxtaposed surfaces must extend parallel to one another (as for the portions 10a and 12a in FIG. 1A) obtains in FIG. 2 also. The element 26 is mounted axially displaceable but nonrotatable on the hub member 20, the inertia member 21 being provided with a guideway 27 extending axially and into which a portion of the member 26 extends to prevent rotation. The displacement of the member 26 axially of the hub member 20 is effected by a nut 28 which in the illustrated embodiment is threaded into inner screw threads formed in the inertia member 21, but could also be threaded onto outer screw threads formed on the hub member 20. Screw threads are identified with reference numeral 29. The operation of the embodiment of FIG. 2 is the same as in FIG. 1.

It is, incidentally, advantageous that not only the surfaces on the inertia member, the hub member and the compression-exerting member are of undulatory configuration (compare FIG. 1A) but that the elastomeric members (e.g. the members 3 of FIG. 1 or the members 23 of FIG. 2) which are also annular similarly have annular surfaces that are of undulatory configuration.

This is, in fact, the case in the embodiments of FIGS. 1 and 2.

Figure 3:
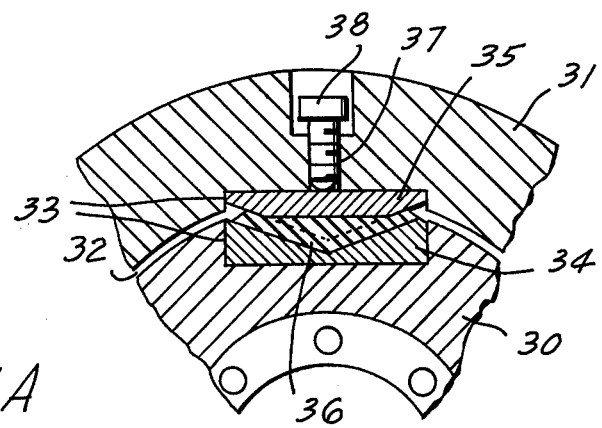
FIG. 3 is a fragmentary cross section through still another embodiment of the invention.

FIG. 3, finally, shows an embodiment wherein undulatory surfaces are not employed. In the embodiment of FIG. 3 an annular hub member 30 is surrounded by an annular inertia member 31 which forms with it a narrow annular gap 32. The inertia member 31 is mounted in the hub member 30 by means of any desired number of radially-acting shock-absorbing mounts. While only a single one is illustrated in FIG. 3, is should be understood that any desired number can be provided spaced angularly (e.g. equi-angularly) about the annular hub 30 and the annular inertia member 31. The units, of which one is shown in FIG. 3, are inserted into recesses 33 of the hub 30 and the inertia member 31, which recesses face one another across the gap 32. They each consist of a lower holding member 34 and an upper holding member 35 which are received in these recesses and between which an elastomeric member 36 of substantially V-shaped or U-shaped cross-section is compressed. It is advantageous if these units are prefabricated, i.e., are produced in the manner of the engine mounts that are used in automobiles. The presence of these units permits vibratory movements of hub 30 and inertia member 31 relative to one another.

In the illustrated embodiment the inertia member 31 is provided with a screw 38 (there will be a similar threaded screw provided for each mount that is present) that extends through a bore 37 and whose inner or leading end bears upon the upper holding member 35, pushing the same towards the lower member 34 and compressing the elastomeric member 36. The screws 38 and the associated bores 37 could also be provided in the hub member 30, but their provision in the inertia member 31 has the advantage that they are more readily accessible.

The use of the elements 5, 28 and 38 as described with respect to the embodiments of FIGS. 1-3 makes it possible to provide a stepless variation in the characteristic frequency of the respective torsional vibration damping device over a given range, by exerting more or less compression upon the respective elastomeric members, and to thereby adapt the characteristic frequency to a particular range of vibratory frequencies which is required to be damped. Moreover, this adjustment and accommodation can be carried out even if the damper has already been installed.

Particularly advantageous damping and adjustment effects are obtained due to the fact that the members 4, 26 and 35 are not pressed against cooperating fixed abutments, but instead act on the respectively juxtaposed elastomeric member while being supported by the members 5, 28 or 37, respectively. This is of particular importance with respect to the embodiments having surfaces or faces which are of undulatory configuration, since an effective change in frequency requires that the elastomeric elements which are subjected to compression and used for damping purposes must be capable of being prestressed to varying degrees in the direction of pressure.

It will be understood that each of the elements described above, or two or more together, may also find a useful application in other types of constructions differing from the types described above.

While the invention has been illustrated and described as embodied in a torsional vibration damper, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A torsional vibration damper for a shaft, particularly for a crankshaft, comprising a hub element adapted to be connected to a shaft and having a first circumferentially extending support surface of axially undulating shape; an inertia element surrounding said hub element and having a circumferentially extending second support surface of axially undulating shape complementary to and juxtaposed with said first surface; an elastomeric member compressed between said surfaces and mounting said inertia element on said hub element and mounting said inertia element on said hub element with freedom of vibration; and means for displacing one of said elements steplessly and axially towards the other element and thereby compressing said member with a steplessly adjustable force for continuously varying the characteristic frequency of vibration of said damper.

2. A torsional vibration damper as defined in claim 1, wherein each of said surfaces is of circumferentially undulatory configuration and composed of a plurality of circumferentially successive surface portions, each surface portion of one surface being located opposite and parallel to a surface portion of the other surface.

3. A torsional vibration damper as defined in claim 2, wherein said hub element has an annular flange provided with said first surface and said inertia member is annular and has one axial end provided with said second surface and another axial end provided with a third surface similar to said second surface; wherein said means comprises an annular member mounted on said hub element adjacent said third surface for movement axially of said hub element toward and away from said flange and being provided with a fourth surface similar to said first surface; and further comprising an additional elastomeric member compressed between said third and fourth surfaces.

4. A torsional vibration damper as defined in claim 3, said means further comprising an axially extending guideway on said hub element and a guided portion on said annular member which extends into said guideway so as to prevent turning of said annular member relative to said hub element, and a ring nut threaded onto said hub element and operative for urging said annular member axially of said hub element towards said inertia member and said annular flange.

5. A torsional vibration damper as defined in claim 2, wherein said hub element has an annular flange provided at one axial end with said first surface and at its other axial end with a third surface similar to said first surface; said means comprising an annular member surrounding said hub element adjacent said third surface and having a fourth surface similar to said second surface but facing said third surface; and further comprising an additional elastomeric member compressed between said third and fourth surfaces.

6. A torsional vibration damper as defined in claim 5, wherein said hub element has an external peripheral face and said inertia element has an annular portion which surrounds said hub element radially spaced therefrom and has an internal peripheral face, one of said faces being provided with threads; and wherein said means further comprises a ring nut meshing with said threads and operative for urging said annular member axially of said hub element towards said flange.

* * * * *